(12) United States Patent
Kurai et al.

(10) Patent No.: US 10,525,867 B2
(45) Date of Patent: Jan. 7, 2020

(54) TRANSPORT VEHICLE

(71) Applicant: HONDA MOTOR CO., LTD., Minato-ku, Tokyo (JP)

(72) Inventors: Kenichiro Kurai, Tochigi-ken (JP); Takuya Mori, Tochigi-ken (JP); Noriaki Shigematsu, Tochigi-ken (JP); Noriko Kurimoto, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/034,482

(22) Filed: Jul. 13, 2018

(65) Prior Publication Data

US 2019/0023174 A1 Jan. 24, 2019

(30) Foreign Application Priority Data

Jul. 18, 2017 (JP) .................. 2017-138697

(51) Int. Cl.
*B25B 11/00* (2006.01)
*B60P 7/08* (2006.01)
*B61B 13/00* (2006.01)

(52) U.S. Cl.
CPC ............ *B60P 7/0892* (2013.01); *B25B 11/00* (2013.01); *B61B 13/00* (2013.01)

(58) Field of Classification Search
CPC B25B 11/00; B25B 5/08; B25B 13/18; B25B 13/24; B25B 13/22; B25B 13/32; B60P 7/0892; B60P 7/03; B23Q 3/062; B23Q 3/06; B61G 1/06; B61G 1/14

USPC .................. 269/246, 156, 291, 111, 113, 119
See application file for complete search history.

(56) References Cited

U.S. PATENT DOCUMENTS

| 4,157,820 | A  | * | 6/1979 | Meuschel | ............. | B23Q 3/062 |
|---|---|---|---|---|---|---|
| | | | | | | 269/319 |
| 6,276,038 | B1 | * | 8/2001 | Boochakorn | ............. | B25B 5/08 |
| | | | | | | 29/281.5 |
| 9,333,610 | B2 | * | 5/2016 | Akagawa | ............. | B23Q 16/004 |
| 2019/0061456 | A1 | * | 2/2019 | Kurai | .................... | B60G 11/14 |

FOREIGN PATENT DOCUMENTS

| JP | 4264824 | 5/2009 |
|---|---|---|
| JP | 4561004 | 10/2010 |
| JP | 5448058 | 3/2014 |

* cited by examiner

*Primary Examiner* — Kaitlin S Joerger
(74) *Attorney, Agent, or Firm* — Amin, Turocy & Watson, LLP

(57) ABSTRACT

An autonomous traveling unit is provided with a pair of toggle mechanisms. The toggle mechanisms respectively have displaceable bodies provided with cam followers. A workpiece loading unit is provided with a member in an X shape to be clamped. The cam followers are respectively advanced to a pair of opposing corners (a first crossing portion and a second crossing portion) of the member to be clamped. When advancing to the pair of opposing corners, the cam followers are respectively brought into abutment on the member to be clamped, whereby the workpiece loading unit is restrained on the autonomous traveling unit.

6 Claims, 6 Drawing Sheets

TRANSPORT VEHICLE

CROSS-REFERENCE TO RELATED APPLICATION

This application is based upon and claims the benefit of priority from Japanese Patent Application No. 2017-138697 filed on Jul. 18, 2017, the contents of which are incorporated herein by reference.

BACKGROUND OF THE INVENTION

Field of the Invention

The present invention relates to a transport vehicle having an autonomous traveling unit and a workpiece loading unit which is detachably supported on the autonomous traveling unit for carrying a workpiece.

Description of the Related Art

Automated guided vehicles (e.g., AGVs) have been in wide use as conveying means for automatically transporting freight (workpieces) in a factory or the like. As AGVs of this type, Japanese Patent Nos. 5448058 and 4561004 disclose the towing type AGVs in which a workpiece loading unit is connected to the front or rear of an autonomous traveling unit. Japanese Patent No. 4264824 discloses the low platform type AGV in which a workpiece loading unit is provided above an autonomous traveling unit In the conventional low-platform type AGVs, an autonomous traveling unit advances below a workpiece loading unit, then the workpiece loading unit is lifted by a predetermined lifting mechanism provided on the autonomous traveling unit. On the other hand, in Japanese Patent No. 4264824, a pin provided on an autonomous traveling unit is engaged with an engaging hole formed in a workpiece loading unit to connect the autonomous traveling unit and the workpiece loading unit.

SUMMARY OF THE INVENTION

In AGVs of the towing type, the autonomous traveling unit and the workpiece loading unit are connected in tandem. This requires a wide moving space for the AGV. Further, in case of a defect in a wheel of the autonomous traveling unit, the workpiece loading unit has to be towed with itself inclined relative to the autonomous traveling unit. In anticipation of the situation like this, it has been necessary to provide a wide margin of space on each side of a traveling path or to install guides. In addition, in this case, because the workpiece loading unit sways relative to the autonomous traveling unit rather freely, position adjustment between the workpiece loading unit and the autonomous traveling unit is inconveniently uneasy. Further, it is difficult for the AGV to move rearward, and it is impossible for the AGV to move laterally. That is, the moving direction of the AGV is substantially restricted to the front.

On the other hand, the AGV described in Japanese Patent No. 4264824 requires pins to have a diameter large enough to withstand the weight load of the workpieces loading unit and the workpieces. Further, in order to allow the relative positional deviation between the autonomous traveling unit and the workpiece loading unit, the diameter of the engaging hole formed in the workpiece loading unit has to be large. Since the workpiece loading unit mounts workpieces thereon, the workpiece loading unit also has to be large to secure rigidity even with a large engaging hole. In general, the number of the workpiece loading units is larger than that of the autonomous traveling units. Therefore, preparation of a large number of the large workpiece loading units results in rising in cost.

A main object of the present invention is to provide a transport vehicle which is easy to perform position adjustment and connection between an autonomous traveling unit and a workpiece loading unit.

Another object of the present invention is to provide a transport vehicle capable of downsizing a workpiece loading unit.

According to one embodiment of the present invention, there is provided a transport vehicle having an autonomous traveling unit and a workpiece loading unit detachably supported over the autonomous traveling unit, the transport vehicle comprising:

at least one pair of toggle mechanisms provided on the autonomous traveling unit and including displaceable bodies that are synchronously displaceable;

cam followers respectively provided on the displaceable bodies; and a member to be clamped on the workpiece loading unit, the cam followers advancing to the member to be clamped; wherein:

the member to be clamped is formed in an X-shape having two pairs of opposing corners;

the cam followers respectively advance to the pair of opposing corners to be brought into abutment on the member to be clamped at positions where the cam followers face each other through the clamped member, so that the workpiece loading unit is restrained on the autonomous traveling unit; and the cam followers are respectively retracted from the pair of opposing corners, so that the workpiece loading unit is released from restraint on the autonomous traveling unit.

In the present invention, the positioning of the workpiece loading unit on the autonomous traveling unit, and the connection between both the units are performed by the cam followers provided on the displaceable bodies of the toggle mechanisms and the member to be clamped. That is, the positioning and the connection are not performed by a pin and an engaging hole. Accordingly, it is not necessary to form any engaging hole in the workpiece loading unit. Naturally, it is also not necessary to configure the workpiece loading unit to be increased in dimension for the sake of securing the rigidity of the workpiece loading unit. In this case, it is also not necessary to provide a lifting mechanism for moving the workpiece loading unit upward or downward.

For the reasons mentioned above, the transport vehicle, especially the autonomous traveling unit can be simplified in structure, and the workpiece loading unit can be downsized, resulting in cost reduction.

Further, the displaceable bodies are displaced to come close to the member to be clamped, whereby the cam followers are pressed on the clamped member for positioning and connection. According to the present invention, it becomes easy to perform the positioning of the workpiece loading unit on the autonomous traveling unit and the connection between both the units.

Further, even if the cam followers and the clamped member are misaligned, because the propulsive forces of the displaceable bodies are exerted on the clamped member, the clamped member is pressed toward the cam followers. As a result, the clamped member and the cam followers are positioned accurately. Therefore, it is not a problem even if the initial positioning between the cam followers and the member to be clamped are rough. That is, with the above-described configuration, the margin for misalignment is increased, while achieving high positioning accuracy.

Moreover, at the aforementioned positioning, the autonomous traveling unit and the workpiece loading unit is moved slightly relative to each other. Therefore, it is possible to reduce the loss of energy such as electricity required for positioning.

In addition, it is possible to connect the autonomous traveling unit and the workpiece loading unit by a great clamping force depending on the toggle mechanisms and to improve the responsiveness to movement. Still Further, because the toggle mechanisms do not require energy to keep the connection, it is also possible to save energy and to reduce running cost.

Further, in the present invention, the autonomous traveling unit does not tow the workpiece loading unit. Therefore, the traveling path does not become expansive, and the margin of space is not necessary even in case of a defect in the autonomous traveling unit. Consequently, it is possible to save space in factories, storage warehouses and the like where the transport vehicle is used. In addition, the moving direction of the transport vehicle is not limited only to the forward direction.

It is preferable that the displaceable bodies each have three cam followers and that the three cam followers on each of the displaceable bodies are arranged at corners of a triangle with one of the cam followers advanced to the opposing corner.

In this construction, it is further preferable that when the one cam follower advanced to the opposing corner is brought into abutment on the clamped member, the remaining two cam followers are also brought into abutment on the clamped member. As the number of cam followers brought into abutment on the clamped member is greater, the clamping forces applied to the clamped member by the toggle mechanisms become greater. That is, the workpiece loading unit is firmly connected to the autonomous traveling unit.

According to the present invention, the workpiece loading unit and the autonomous traveling unit is positioned and connected by using the cam followers provided on the displaceable bodies of the toggle mechanisms provided on the autonomous traveling unit, and the member to be clamped provided on the workpiece loading unit. With this configuration, the transport vehicle, especially the autonomous traveling unit becomes simplified in structure, and the workpiece loading unit can be downsized. Accordingly, it is possible to reduce the cost. Further, the allowance of the misalignment between the cam followers and the clamped member can be large, while achieving high positioning accuracy.

Further, by taking the aforementioned construction, it becomes easy to position and connect the autonomous traveling unit and the workpiece loading unit. Still further, because the autonomous traveling unit and the workpiece loading unit are moved only slight in positioning and connecting, it is possible to reduce the loss of energy such as electricity or the like required for positioning.

In addition, it is possible to connect the autonomous traveling unit and the workpiece loading unit by the toggle mechanisms with a sufficient clamping force to improve the responsiveness to the movement. Yet further, by the use of the toggle mechanisms, it is possible to save energy and reduce running costs.

The above and other objects, features, and advantages of the present invention will become more apparent from the following description when taken in conjunction with the accompanying drawings, in which preferred embodiments of the present invention are shown by way of illustrative examples.

DESCRIPTION OF THE PREFERRED EMBODIMENTS

Hereinafter, with reference to the accompanying drawings, a transport vehicle according to the present invention will be described in detail based on preferred embodiments.

Figure 1:
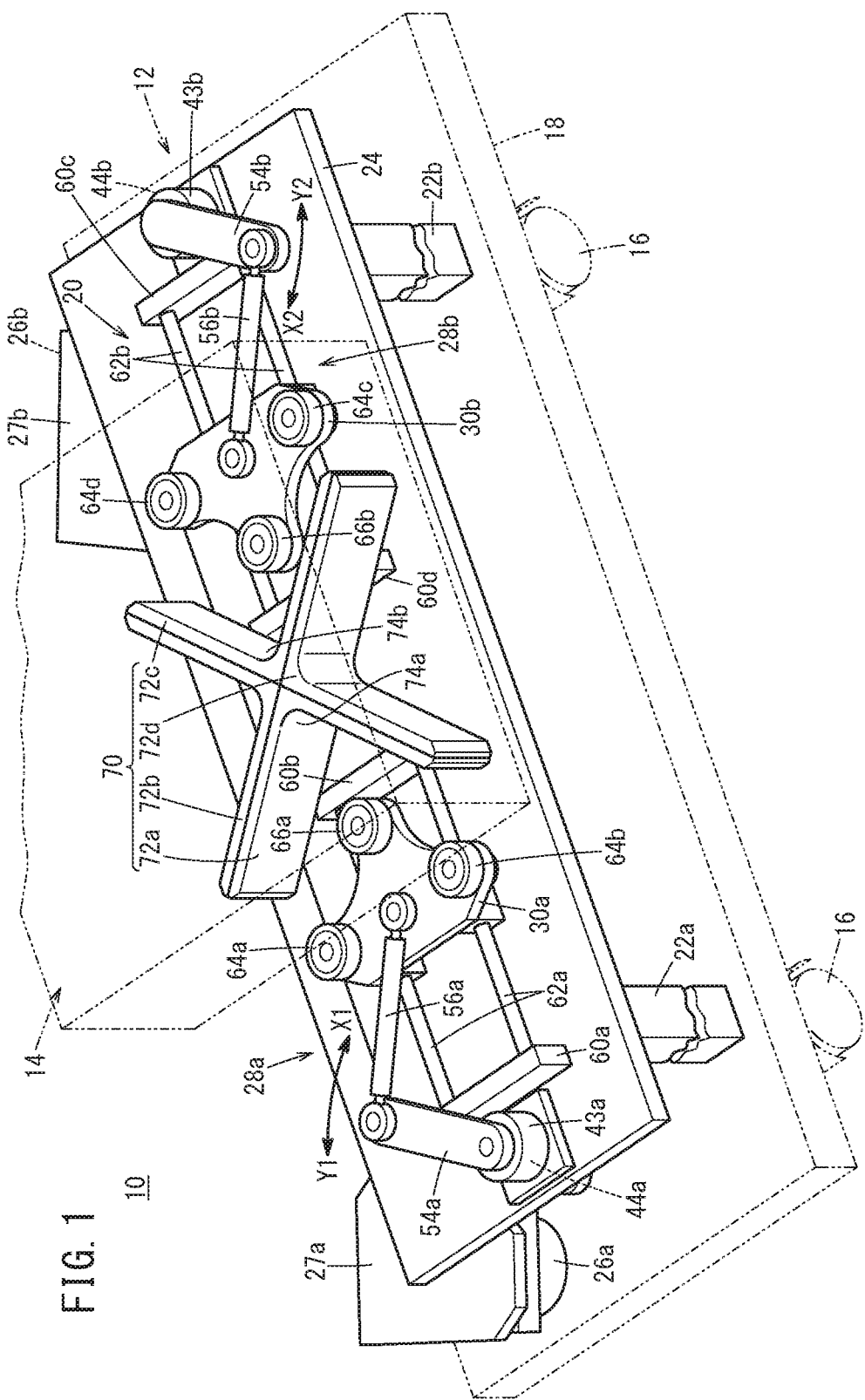
FIG. 1 is a schematic perspective view of a main part of a transport vehicle according to an embodiment of the present invention.

FIG. 1 is a schematic perspective view of a main part of a transport vehicle 10 according to the present invention. The transport vehicle 10 has an autonomous traveling unit 12 and a workpiece loading unit 14 arranged over the autonomous traveling unit 12 and connected to the autonomous traveling unit 12. That is, the transport vehicle 10 is a so-called AGV.

The autonomous traveling unit 12 has a base 18 including wheels 16 as shown by the imaginary lines and a clamping mechanism 20 provided on the base 18. The clamping mechanism 20 is supported on the base 18 through legs 22a, 22b.

Figure 2:
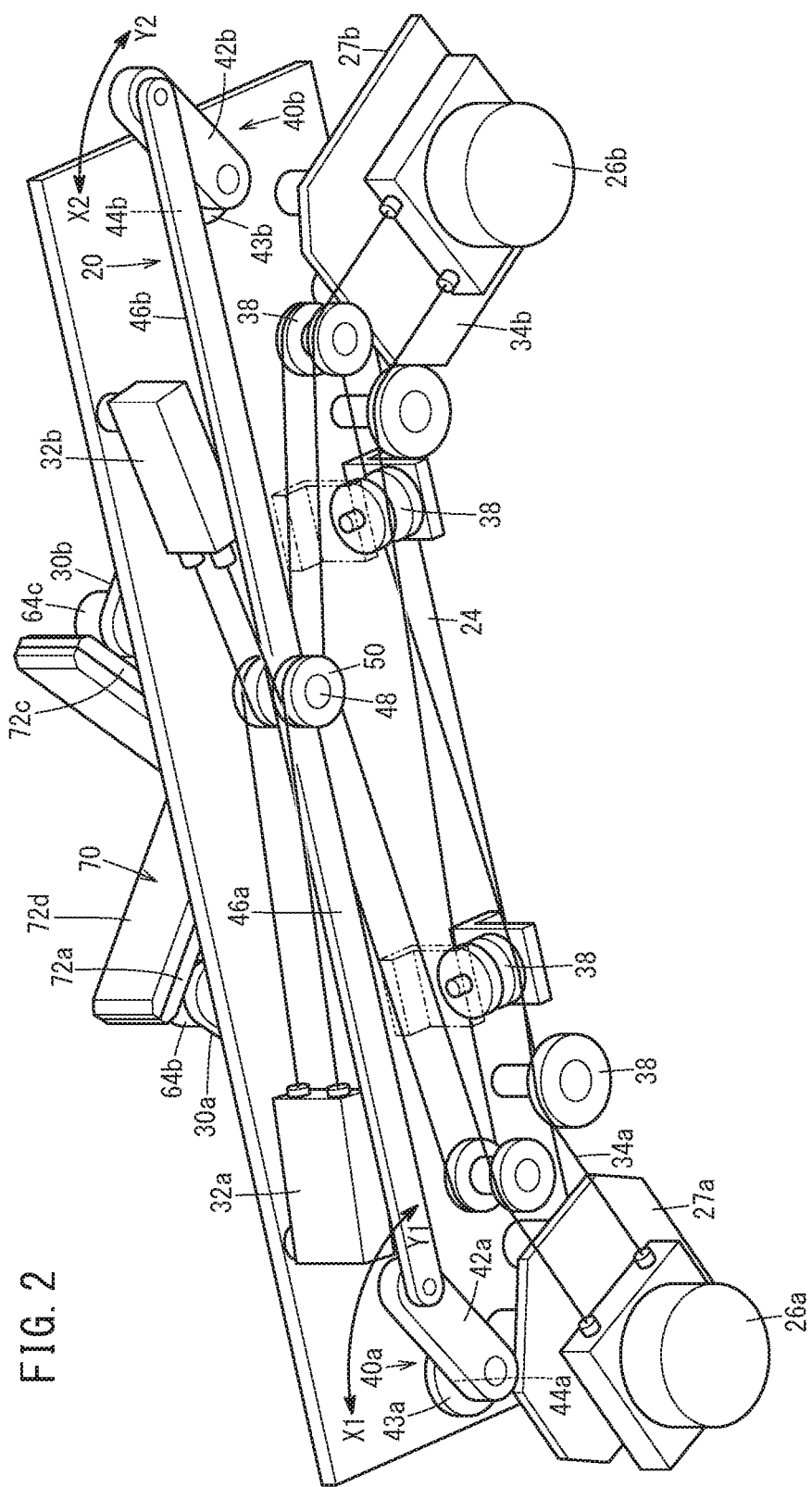
FIG. 2 is a schematic perspective view of a main part showing a link mechanism of a clamping mechanism provided on an autonomous traveling unit shown in FIG. 1.

The clamping mechanism 20 includes a base plate 24 of a flat shape elongated in a front-rear direction of the transport vehicle 10. As shown in FIG. 2 in which the legs 22a, 22b and the like are omitted from illustration, a first drive motor 26a and a second drive motor 26b of the clamping mechanism 20 are supported on a lower end surface of the base plate 24 through motor support bases 27a, 27b. These first drive motor 26a and second drive motor 26b are provided for synchronously displacing in a horizontal direction a first slider 30a (displaceable body) of a first toggle mechanism 28a and a second slider 30b (displaceable body) of a second toggle mechanism 28b which will be referred to later.

A first wire 34a and a second wire 34b are wound around the first drive motor 26a and the second drive motor 26b, respectively, from a first wire-hooking portion 32a and a second wire-hooking portion 32b as starting points. A plurality of drive pulleys 38 are installed between the first drive motor 26a and the second drive motor 26b, and the first wire 34a and the second wire 34b are wound around these drive pulleys 38.

In the vicinity of the first drive motor 26a, a first short arm member 42a of a first link mechanism 40a is connected to a first pivot shaft 44a in a bushing 43a. A first long arm member 46a is connected to the first short arm member 42a. Likewise, in the vicinity of the second drive motor 26b, a second short arm member 42b of a second link mechanism 40b is connected to a second pivot shaft 44b in a bushing 43b. A second long arm member 46b is connected to the second short arm member 42b.

A third pivot shaft 48 is interposed between the first long arm member 46a and the second long arm member 46b, and a pivot pulley 50 is provided on the third pivot shaft 48. When the third pivot shaft 48 is integrally pivoted with the pivot pulley 50, the first and second long arm members 46a, 46b follow the pivot pulley 50 to advance or retract, and the first and the second short arm members 42a, 42b are angularly moved.

On the other hand, as shown in FIG. 1, a first toggle mechanism 28a and a second toggle mechanism 28b are provided on its upper end surface of the base plate 24. The first and second toggle mechanisms 28a, 28b make up the clamping mechanism 20 together with the first drive motor 26a and the second drive motor 26b. The first toggle mechanism 28a includes a first slider 30a having an approximately triangle shape, a first toggle arm 54a for displacing the first slider 30a, and a first rod 56a connecting the first slider 30a to the first toggle arm 54a.

A first support member 60a upstands on the base plate 24 below the first toggle arm 54a, and a second support member 60b upstands at a position separated a predetermined distance from the first support member 60a toward the second toggle mechanism 28b. Two first guide bar members 62a are bridged from the first support member 60a to the second support member 60b, and the first slider 30a is displaced by being guided along the first guide bar members 62a.

The first slider 30a has an approximately triangle shape with a base facing the first rod 56a, and is provided with cam followers 64a, 64b, 66a at respective corners. That is, the first slider 30a has three cam followers 64a, 64b, 66a. Hereafter, the two cam followers provided on the base facing the first rod 56a will be referred to as first base-side cam followers 64a, 64b, whereas the one cam follower provided on the corner facing the second toggle mechanism 28b will be referred to as a first vertex-side cam follower 66a.

The first slider 30a having a structure like this is connected to the first toggle arm 54a through the first rod 56a. Further, the first toggle arm 54a is connected to the first pivot shaft 44a.

The second toggle mechanism 28b has a structure similar to the first toggle mechanism 28a. That is, the second toggle mechanism 28b has a second slider 30b having an approximately triangle shape, a second toggle arm 54b supported by the second pivot shaft 44b, and a second rod 56b connecting the second slider 30b to the second toggle arm 54b. The second slider 30b is displaced by being guided along two second guide bar members 62b which bridge from a third support member 60c to a fourth support member 60d.

The second slider 30b has an approximately triangle shape with a base facing the second rod 56b, and is provided with cam followers 64c, 64d, 66b at respective corners. That is, the second slider 30b is also provided with second base-side cam followers 64c, 64d and a second vertex-side cam follower 66b.

The autonomous traveling unit 12 constructed as described above autonomously travels while being guided by a suitable guide means such as, for example, magnet, signal or the like.

The workpiece loading unit 14 is provided for mounting freight (workpieces), not shown, and is provided with a member to be clamped 70 at its bottom portion. The member to be clamped 70 is configured by four V-shape cam members 72a to 72d are combined and abutted at their bottoms to form an intersection point P, to define two pairs of opposing corners. As a result, the member to be clamped 70 has an X shape. Hereafter, for the sake of convenience in description, one pair of opposing corners facing each other with the intersection point P as the border will be referred to as a first crossing portion 74a and a second crossing portion 74b. The first crossing portion 74a faces the first vertex-side cam follower 66a, while the second crossing portion 74b in a diagonal relation with the first crossing portion 74a faces the second vertex-side cam follower 66b.

The transport vehicle 10 according to the present embodiment is basically constructed as described above, and next, the operation and effects will be described.

When a workpiece is to be transferred using the transport vehicle 10, first of all, the operator loads the workpiece on the workpiece loading unit 14. Then, the autonomous traveling unit 12 advances below the workpiece loading unit 14, so that the state shown in FIG. 1 is met. At this point of time, of course, the first toggle mechanism 28a and the second toggle mechanism 28b have not yet gripped the member to be clamped 70. Further, the first crossing portion 74a and the second crossing portion 74b of the member to be clamped 70 are not particularly required to exactly face the first vertex-side cam follower 66a and the second vertex-side cam follower 66b, respectively.

Subsequently, the first drive motor 26a and the second drive motor 26b are energized. With this, the first wire 34a is fed out from the first drive motor 26a, whereas the second wire 34b is wound by the second drive motor 26b. As a result, the drive pulleys 38 rotate. Further, the third pivot shaft 48 is pivoted, whereby the first long arm member 46a is pushed out in a direction away from the second long arm member 46b, while the second long arm member 46b is drawn to come close to the first long arm member 46a.

Thus, the first short arm member 42a is pivoted in the arrow X1 (clockwise) direction in FIG. 2 about the first pivot shaft 44a. On the other hand, the second short arm member 42b is pivoted in the arrow X2 (clockwise) direction in FIG. 2 about the second pivot shaft 44b. The first short arm member 42a and the second short arm member 42b are respectively connected to the first pivot shaft 44a and the second pivot shaft 44b. Accordingly, the first pivot shaft 44a and the second pivot shaft 44b are pivoted clockwise as the first short arm member 42a and the second short arm member 42b rotate.

The first pivot shaft 44a and the second pivot shaft 44b are respectively connected to the first toggle arm 54a and the second toggle arm 54b. Therefore, as the first pivot shaft 44a and the second pivot shaft 44b rotate as described above, the first toggle arm 54a and the second toggle arm 54b integrally rotate in the same direction, that is, toward the arrows X1 and X2 (clockwise) direction in FIG. 1, respectively.

Figure 3:
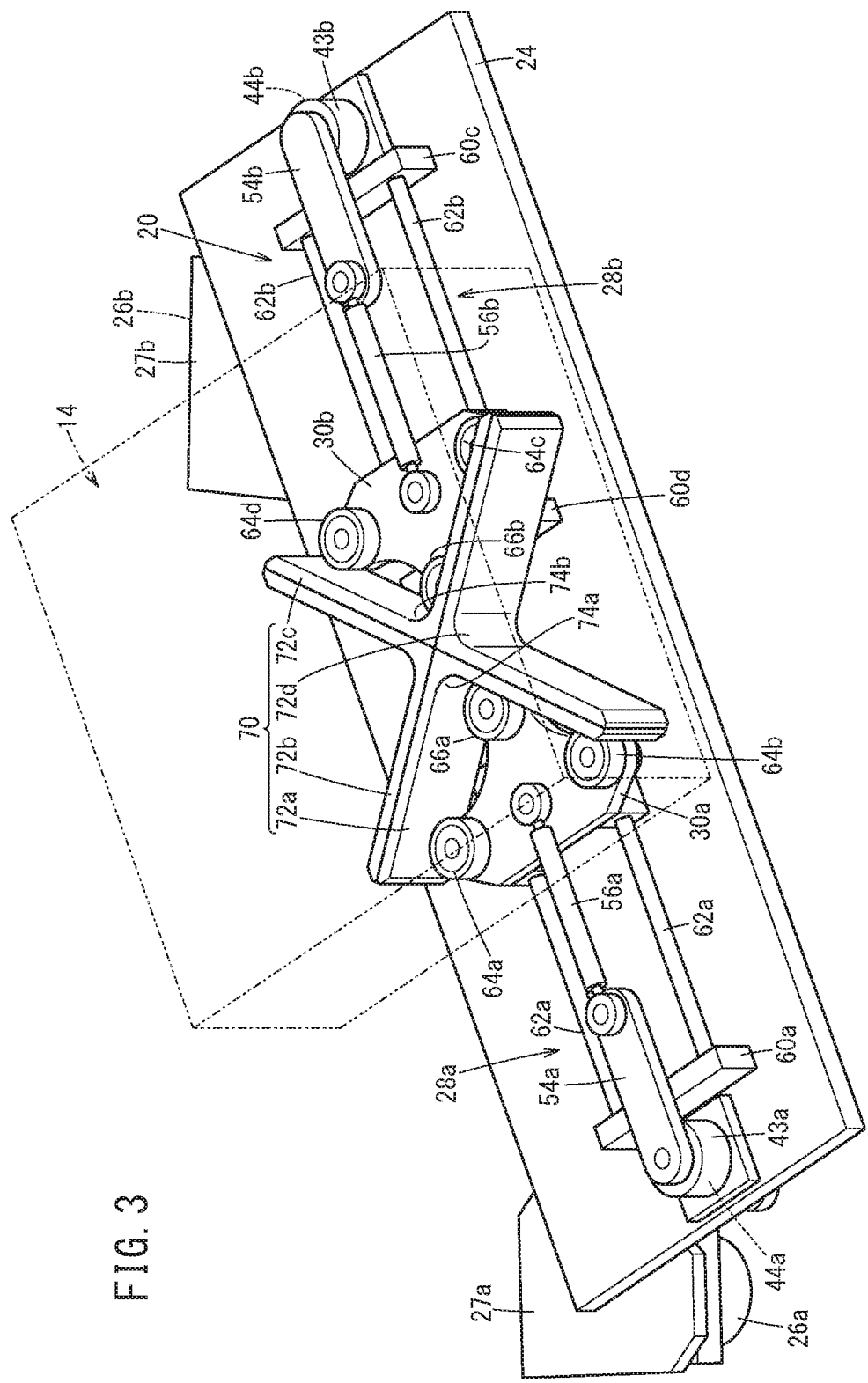
FIG. 3 is a schematic perspective view of a main part showing a state in which a member to be clamped provided on a workpiece loading unit shown in FIG. 1 is sandwiched by a first toggle mechanism and a second toggle mechanism.

As a result, as shown in FIG. 3, the first toggle arm 54a and the first rod 56a extend along the same axis to advance the first slider 30a toward the member to be clamped 70. Likewise, the second toggle arm 54b and the second rod 56b extend along the same axis to advance the second slider 30b toward the member to be clamped 70. Meanwhile, the first slider 30*a* is guided by the first guide bar members 62*a*, and the second slider 30*b* is guided by the second guide bar members 62*b*.

Figure 4:
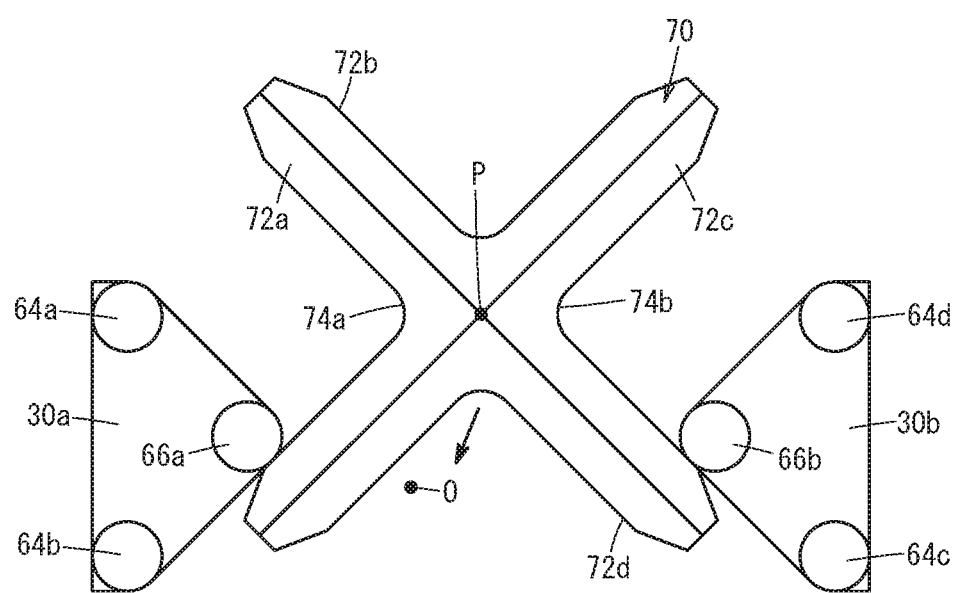
FIG. 4 is a schematic plan view of a main part schematically showing a state in which respective distal ends of a first slider (displaceable body) and a second slider (displaceable body) abut against the member to be clamped deviated from an ideal position.

At this time, as shown in FIG. 4, for example, the crossing point P of the V-shape cam members 72*a* to 72*d* is deviated from the ideal position O. In this case, the first vertex-side cam follower 66*a* and the second vertex-side cam follower 66*b* do not respectively face the first crossing portion 74*a* and the second crossing portion 74*b*, but respectively abut on portions of the V-shape cam members 72*a* and 72*c*.

Figure 5:
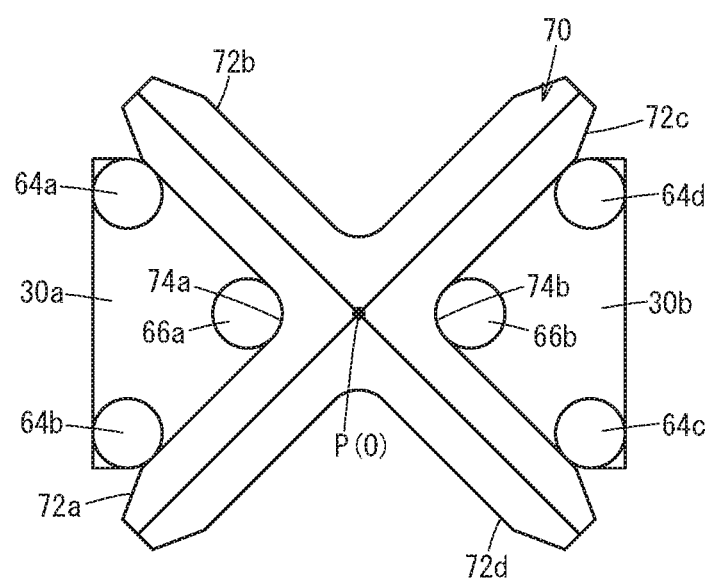
FIG. 5 is a schematic plan view of a main part schematically showing a state in which the respective ends of the first and second sliders having been corrected to the ideal positions advance to a crossing portion of the clamped member.

If the first slider 30*a* and the second slider 30*b* further advance (move straight) in this state, the propulsive forces of the first slider 30*a* and the second slider 30*b* cause the first vertex-side cam follower 66*a* and the second vertex-side cam follower 66*b* to exert pressing forces on the clamped member 70. That is, the first vertex-side cam follower 66*a* and the second vertex-side cam follower 66*b* relatively move the V-shape cam members 72*a*, 72*c*, whereby the crossing point P comes to agreement with the ideal position O, as shown in FIG. 5. That is, the first vertex-side cam follower 66*a* advances to the first crossing portion 74*a*, and the second vertex-side cam follower 66*b* advances to the second crossing portion 74*b*. As a result, the position adjustment is performed between the autonomous traveling unit 12 and the workpiece loading unit 14.

At this time, the first vertex-side cam follower 66*a* is brought into abutment on two walls defining the first crossing portion 74*a*, while the second vertex-side cam follower 66*b* is brought into abutment on two walls defining the second crossing portion 74*b*. At the same time, the first base-side cam followers 64*a*, 64*b* are brought into abutment on the V-shape cam member 72*a*, and likewise, the second base-side cam followers 64*c*, 64*d* are brought into abutment on the V-shape cam member 72*c*. By the abutments like this, the clamped member 70 can be firmly gripped by the first toggle mechanism 28*a* and the second toggle mechanism 28*b*. That is, the workpiece loading unit 14 is connected to the autonomous traveling unit 12 by a great clamping force, thereby forms the transport vehicle 10.

In the present embodiment, the member to be clamped 70 has a cam structure. In particular, the first vertex-side cam follower 66*a* and the second vertex-side cam follower 66*b* press the clamped member 70, so that the workpiece loading unit 14 is positioned with respect to the autonomous traveling unit 12. As a result, an allowance range for the positional deviation is widened. Accordingly, it becomes easier to connect the workpiece loading unit 14 to the autonomous traveling unit 12. In addition, the accuracy in the position adjustment becomes satisfactory.

Further, the autonomous traveling unit 12 and the workpiece loading unit 14 relatively move only slightly for position adjustment or connection. Therefore, it is possible to reduce the energy such as electricity or the like required for position adjustment or connection.

The autonomous traveling unit 12 self-travels in this state. That is, together with the workpiece loading unit 14, the workpiece is conveyed by the autonomous traveling unit 12 to a predetermined destination. During conveyance, the workpiece loading unit 14 is firmly connected to the autonomous traveling unit 12 by the first toggle mechanism 28*a* and the second toggle mechanism 28*b* with a great clamping force, and hence, it is possible to improve responsiveness to the movement. Further, according to the first toggle mechanism 28*a* and the second toggle mechanism 28*b*, energy is not required for keeping the connection (the clamping of the clamped member 70 by the cam followers 64*a*-64*d*, 66*a*, 66*b*) between the autonomous traveling unit 12 and the workpiece loading unit 14. Therefore, it is also possible to save energy and reduce running costs.

Subsequently, the workpiece is unloaded, and the workpiece loading unit 14 is released from the autonomous traveling unit 12. At this time, the first drive motor 26*a* and the second drive motor 26*b* are energized. Contrary to the above, the second wire 34*b* is fed from the second drive motor 26*b*, while the first wire 34*a* is wound by the first drive motor 26*a*. As a result, the drive pulleys 38 are rotated to pivot the third pivot shaft 48, whereby the first long arm member 46*a* is drawn toward a direction approaching the second long arm member 46*b*, while the second long arm member 46*b* is pushed out toward a direction separating from the first long arm member 46*a*.

That is, the first short arm member 42*a* is pivoted about the first pivot shaft 44*a* in the arrow Y1 direction in FIG. 2 (i.e., counterclockwise), while the second short arm member 42*b* is pivoted about the second pivot shaft 44*b* in the arrow Y2 (counterclockwise) direction in FIG. 2 (i.e., counterclockwise). Further, the first pivot shaft 44*a* and the second pivot shaft 44*b* are pivoted counterclockwise, and integrally therewith, the first toggle arm 54*a* and the second toggle arm 54*b* are pivoted toward the arrows Y1 and Y2 directions (counterclockwise) in FIG. 1.

As a consequence, as shown in FIG. 1, the first slider 30*a* and the second slider 30*b* are retracted toward respective directions separating from the clamped member 70 while being guided by the first guide bar members 62*a* and the second guide bar members 62*b*, respectively. Finally, the first toggle arm 54*a* is inclined relative to the first rod 56*a*, while the second toggle arm 54*b* is inclined relative to the second rod 56*b*, whereby the first vertex-side cam follower 66*a*, the first base-side cam followers 64*a*, 64*b*, the second vertex-side cam follower 66*b* and the second base-side cam followers 64*c*, 64*d* are withdrawn (released) from the clamped member 70. Consequently, it becomes possible for the workpiece loading unit 14 to be released from the autonomous traveling unit 12.

According to the present embodiment, the positioning of the workpiece loading unit 14 on the autonomous traveling unit 12 does not require a pin or engaging hole. For this reason, it is not necessary to make the workpiece loading unit 14 large in dimension in order to secure the rigidity of the workpiece loading unit 14. Accordingly, the rising in cost can be avoided even if a large number of workpiece loading units 14 are prepared.

Further, a lifting mechanism for lifting the workpiece loading unit 14 vertically is not required, so that the transport vehicle 10 becomes simple in structure, so that the cost can be further reduced.

Further, the member to be clamped 70 can be acquired by bending four bar members each into a V-shape and then joining the respective members. That is, it is possible to manufacture the member to be clamped 70 easily.

In addition, in the present embodiment, the autonomous traveling unit 12 is not designed to tow the workpiece loading unit 14. Therefore, the margin of space which may otherwise be used in the event of a defect in the wheels 16 of the autonomous traveling unit 12 is not required, and the extensive moving space is also not required. In other words, space saving can be realized in factories, storage warehouses and the like where the transport vehicle 10 is used. In addition, advantageously, the moving direction of the autonomous traveling unit 12 is not restricted only to the forward direction.

The present invention is not limited to the foregoing embodiment and can be modified variously without departing from the gist of the present invention.

Figure 6:
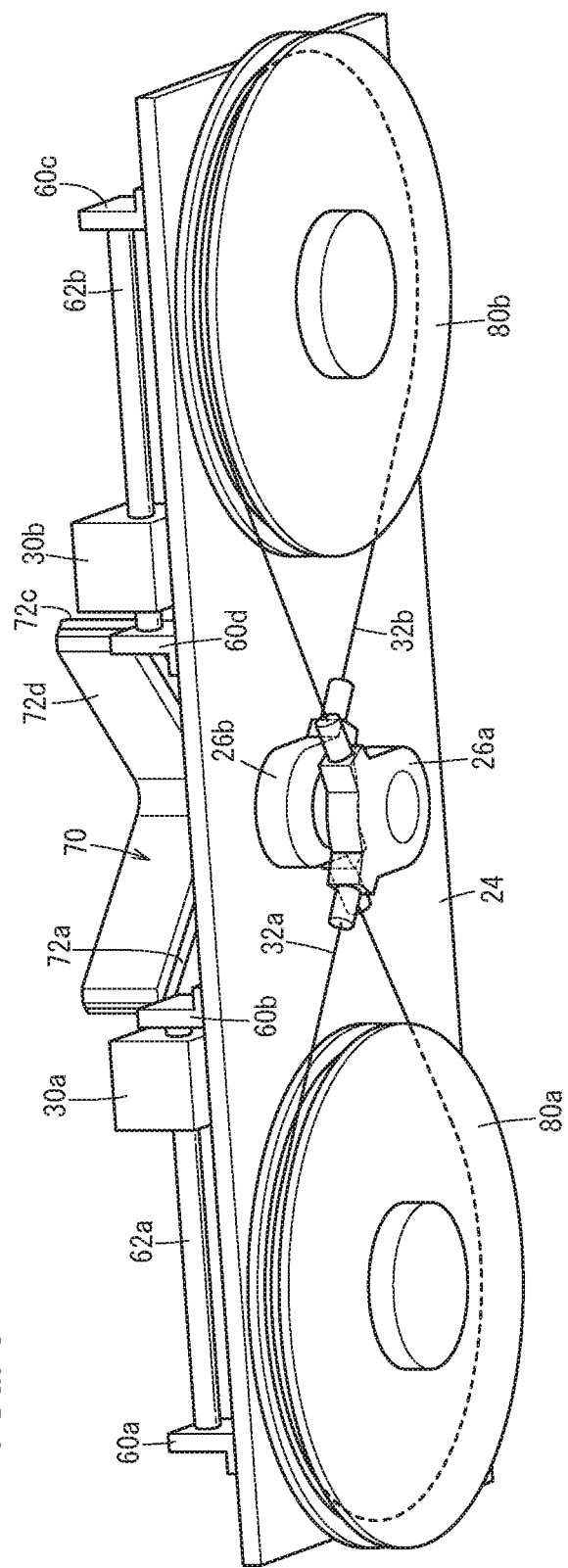
FIG. 6 is a schematic perspective view of a main part showing another example of the clamping mechanism.

For example, the driving mechanisms for displacing the first slider 30*a* and the second slider 30*b* are not particularly limited to the first link mechanism 40*a* and the second link mechanism 40*b* and may be a first drive pulley 80*a* and a second drive pulley 80*b* shown in FIG. 6.

Further, in the case where the clamped member 70 can be gripped with a sufficient force even only with the first vertex-side cam follower 66*a* and the second vertex-side cam follower 66*b*, it is not particularly required to provide the first base-side cam followers 64*a*, 64*b* and the second base-side cam followers 64*c*, 64*d*.

Further, the member to be clamped 70 may be formed by the combination of two straight-shaped cam members. In this case, a notch is formed at a middle portion in the longitudinal direction of each straight-shaped cam member, and the straight-shaped cam members are mutually engaged at their notches. It is possible to produce the member to be clamped 70 easily in this manner.

In either case, there may be further provided additional sliders each with a vertex-side cam follower which advances to a remaining crossing portion interposed between the first crossing portion 74*a* and the second crossing portion 74*b*.

What is claimed is:

1. A transport vehicle having an autonomous traveling unit and a workpiece loading unit detachably supported over the autonomous traveling unit, the transport vehicle comprising:

at least one pair of toggle mechanisms provided on the autonomous traveling unit and including displaceable bodies that are synchronously displaceable;

cam followers provided on the displaceable bodies; and a member to be clamped on the workpiece loading unit and configured to allow the cam followers to advance to the member to be clamped;

wherein:

the member to be clamped is formed in an X-shape having two pairs of opposing corners;

the cam followers respectively advance to one pair of opposing corners to abut on the member to be clamped at opposing positions over the clamped member, so that the workpiece loading unit is restrained on the autonomous traveling unit; and the cam followers are respectively retracted from the one pair of opposing corners, so that the workpiece loading unit is released from restraint on the autonomous traveling unit.

2. The transport vehicle according to claim 1, wherein:

the displaceable bodies each have three cam followers; and the three cam followers are arranged at vertices of a triangle with one of the cam followers advanced to the opposing corner.

3. The transport vehicle according to claim 2, wherein:

when the one of the cam followers advanced to the opposing corner is brought into abutment on the clamped member, the remaining two cam followers are also brought into abutment on the clamped member.

4. The transport vehicle according to claim 2, wherein:

the displaceable bodies are each formed in an approximately triangle shape.

5. The transport vehicle according to claim 1, wherein:

the displaceable bodies are displaceable to come close to or away from each other in a horizontal direction.

6. The transport vehicle according to claim 1, further comprising:

guide members that guide the displaceable bodies when the displaceable bodies are displaced.

* * * * *